United States Patent
Tai

(10) Patent No.: US 8,345,421 B2
(45) Date of Patent: Jan. 1, 2013

(54) REMOVABLE COVER ASSEMBLY FOR SEALING OPENING OF HOUSING

(75) Inventor: Kuang-Cheng Tai, Hsinchu (TW)

(73) Assignee: Getac Technology Corporation, Hsinchu (TW)

( * ) Notice: Subject to any disclaimer, the term of this patent is extended or adjusted under 35 U.S.C. 154(b) by 427 days.

(21) Appl. No.: 12/609,877

(22) Filed: Oct. 30, 2009

(65) Prior Publication Data

US 2011/0043973 A1 Feb. 24, 2011

(30) Foreign Application Priority Data

Aug. 19, 2009 (CN) .......................... 2009 1 0170417

(51) Int. Cl.
*H05K 7/14* (2006.01)
(52) U.S. Cl. .............. 361/679.58; 361/679.01; 312/296; 292/DIG. 37
(58) Field of Classification Search ............ 361/679.01, 361/679.02, 679.58, 724–727, 679.31–679.39, 361/679.59, 679.55
See application file for complete search history.

(56) References Cited

U.S. PATENT DOCUMENTS

| | | | | |
|---|---|---|---|---|
| 5,218,169 A | * | 6/1993 | Riceman | 174/67 |
| 5,264,986 A | * | 11/1993 | Ohgami et al. | 361/679.37 |
| 5,580,182 A | * | 12/1996 | Lin | 403/325 |
| 6,002,581 A | * | 12/1999 | Lindsey | 361/679.55 |
| 6,099,097 A | * | 8/2000 | Hocker et al. | 312/327 |
| 7,370,772 B2 | * | 5/2008 | Brunson | 220/326 |
| 7,443,668 B2 | * | 10/2008 | Hsu | 361/679.33 |
| 7,789,437 B2 | | 9/2010 | Sheng | |

FOREIGN PATENT DOCUMENTS

CN 1988772 A 6/2007

* cited by examiner

*Primary Examiner* — Jinhee Lee
*Assistant Examiner* — Ingrid Wright

(57) ABSTRACT

A removable cover assembly for sealing an opening of a housing includes a case, a latch, and an elastic member. The latch is movably disposed in the case, and includes a connection portion, a push portion, and a latching portion. The connection portion is disposed along a moving axis. The push portion is disposed at one end of the connection portion and exposed out of the case through an operation hole. The latching portion is disposed at the other end of the connection portion, and has a first position to protrude out of the case through an aperture and a second position to be retracted in the case. The elastic member is disposed in the interior space for pushing the latch along the moving axis, such that the latching portion protrudes out of the case consciously, thereby fixing the removable cover assembly to the housing and sealing the opening.

23 Claims, 9 Drawing Sheets

REMOVABLE COVER ASSEMBLY FOR SEALING OPENING OF HOUSING

BACKGROUND OF THE INVENTION

1. Technical Field

The present invention relates to a housing of an electronic device, and more particularly to a removable cover assembly for sealing an opening of a housing.

2. Related Art

Electrical sockets, optical disk drives, or removable storage devices of an electronic device has to be exposed on the surface of the housing of the electronic device, such that an electrical dockets can be connected to an electrical connector, and an optical disk or a storage medium can be replaced. Thus, an opening is required on the housing of the electronic device for disposing the aforementioned pluggable or replaceable device.

However, the opening of the housing also becomes a channel for the intrusion of foreign objects into the housing. The intrusion of foreign objects such as water or dust into the housing causes the operation of the electronic device to be abnormal. For example, a large amount of dust makes a cooling fan unable to operate normally and even results in short-circuit in the electronic device. The water not only causes short-circuit, but also directly damages the circuit of the electronic device.

In the prior art, covers of different type are disposed at the place where the opening is opened to seal the opening to solve the above problems. The types of the aforementioned covers include flexible covers and rigid covers. A flexible cover is usually made of an elastic material such as rubber and has a cross-sectional area slightly larger than an area of the opening. When being inserted into the opening, the flexible cover is compressed to seal the opening and to be fixed at the opening. However, after being repeatedly pulled off and inserted, the flexible cover is easily damaged, resulting in a reduced sealing effect. The rigid cover usually includes an elastic fastener for fastening the rigid cover to the housing, such that the rigid cover is fixed to the housing and seals the hole. The more difficult the elastic fastener is deformed under stress, the better the fixing effect is. However, the elastic fastener that is not easily deformed under stress has the problem of being difficult to operate.

SUMMARY

In view of the problem that a cover for sealing an opening of a housing is easily damaged or difficult to operate, the present invention is directed to a removable cover assembly for sealing an opening of a housing. The removable cover assembly is not easily to be damaged due to repeated operation and is easily to operate.

The present invention provides a removable cover assembly for sealing an opening of a housing. The removable cover assembly includes a case, a latch, and an elastic member. The case includes a front cover and a back cover combined with each other to form an interior space inside the case. The front cover includes at least one operation hole in communication with an exterior of the case and the interior space. At least one side of the case includes an aperture in communication with the interior space. The latch is movably disposed in the interior space, and includes a connection portion, a push portion, and a latching portion. The connection portion is disposed along a moving axis. The push portion is disposed at one end of the connection portion, corresponding to the operation hole, and exposed out of the operation hole. The latching portion is disposed at the other end of the connection portion and corresponding to the aperture. The latching portion has a first position protruding out of the case through the aperture and a second position being retracted in the case through the aperture. The elastic member is disposed in the interior space and applies a force to the latch along the moving axis, such that the latching portion runs through the aperture and normally remains at the first position protruding out of the case.

The latching portion is used for latching the housing to fix the removable cover assembly to the opening of the housing, so as to seal the opening. When the removable cover assembly is to be detached, a pressure only needs to be applied to the push portion of the latch, such that the latching portion is retracted in the case through the aperture and located at the second position inside the case. In this way, the latching portion is no longer latch the housing.

The advantage of the present invention lies in that, a moving direction of the latch is perpendicular to a direction in which the removable cover assembly is detached from the housing, such that a force for detaching the removable cover assembly from the housing does not cause the latching portion to be retracted into the case. Therefore, the elastic member only needs to provide a small force to maintain the latching portion in the protruding state. When moving the latch, only a small force needs to be applied to counteract the force of the elastic member, such that the present invention has the advantage of being easy to operate.

BRIEF DESCRIPTION OF THE DRAWINGS

The present invention will become more fully understood from the detailed description given herein below for illustration only, and thus are not limitative of the present invention, and wherein.

DETAILED DESCRIPTION

Figure 1:
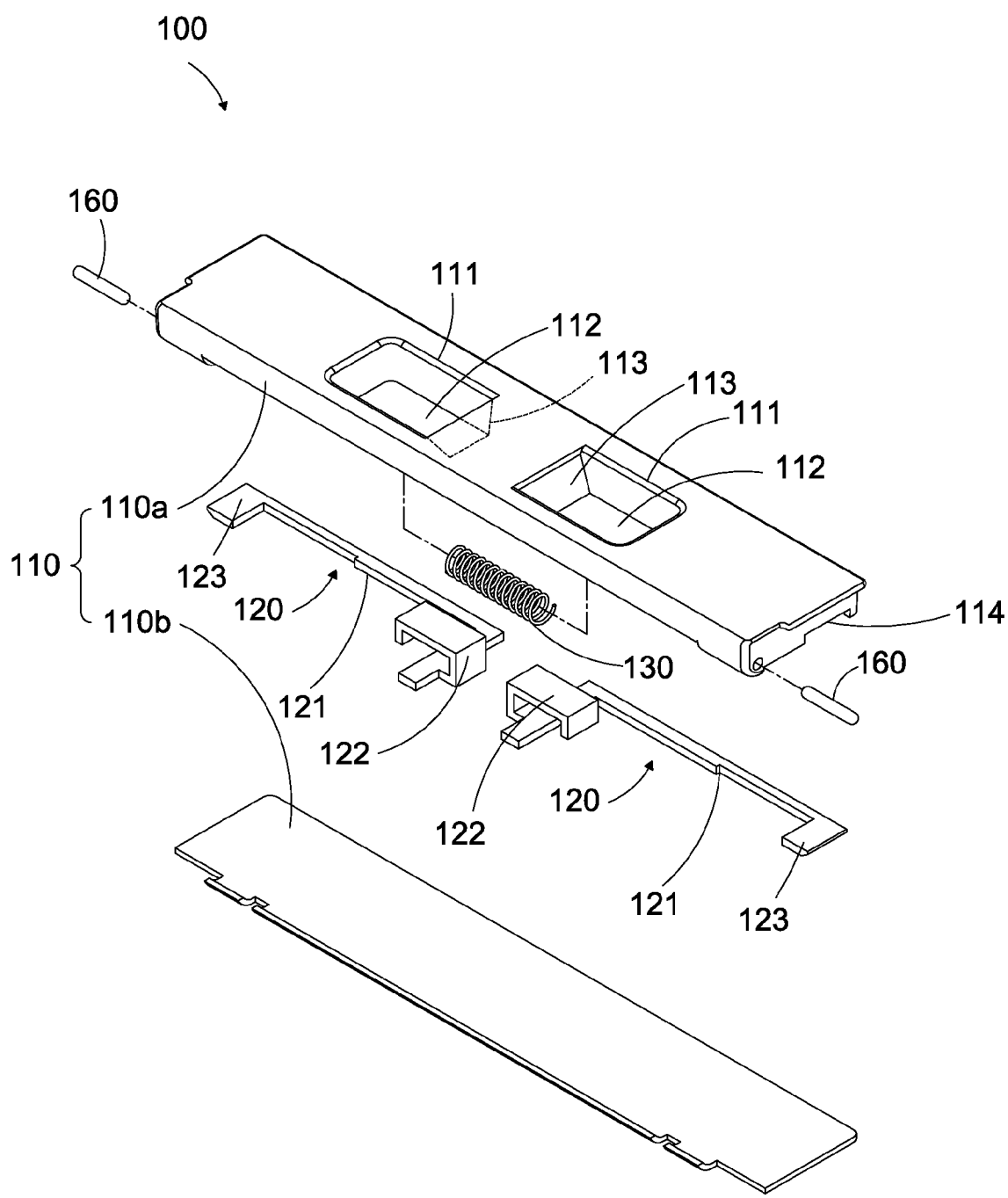
FIGS. 1 and 2 are exploded views of a first embodiment of the present invention from different viewing angles.
Figure 2:
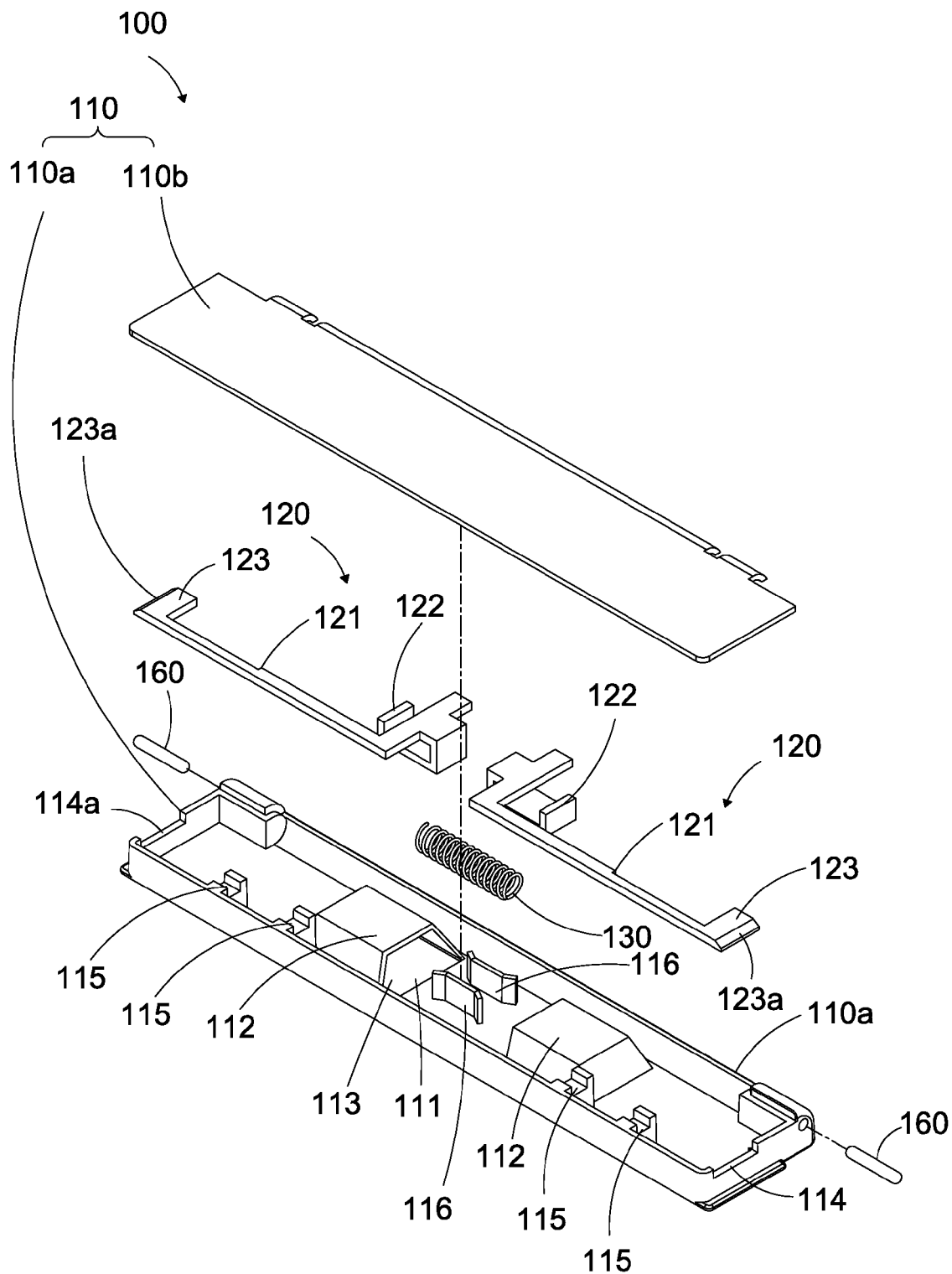

Referring to FIGS. 1 and 2, a removable cover assembly 100 according to a first embodiment of the present invention is provided for sealing an opening of a housing. The removable cover assembly 100 includes a case 110, two latches 120, and an elastic member 130.

Figure 3:
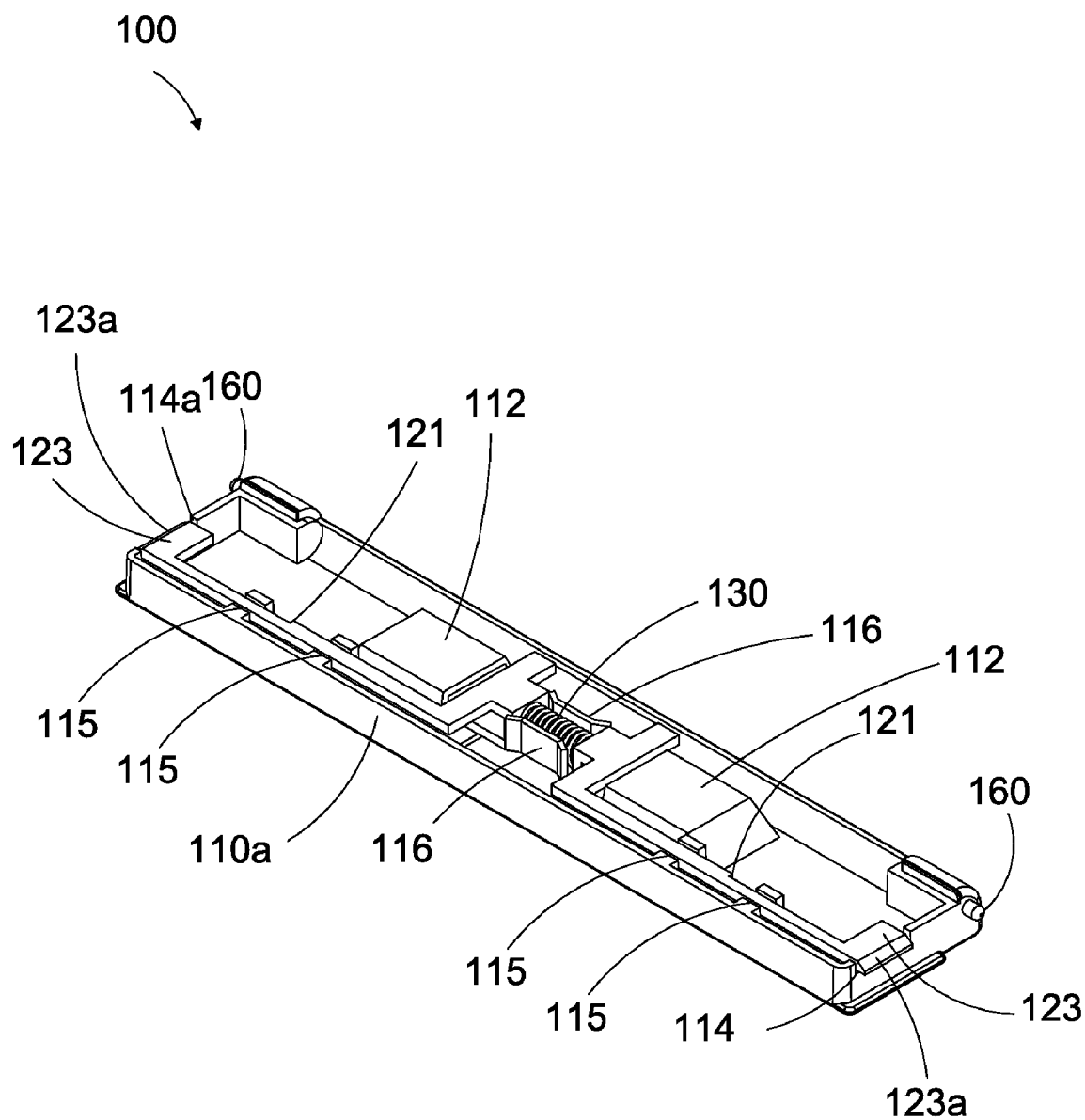
FIG. 3 is a three-dimensional view of the first embodiment of the present invention in which the back cover of the removable cover assembly is not shown.

Referring to FIGS. 1, 2, and 3, the case 110 includes a front cover 110a and a back cover 110b that can be combined with each other to form an interior space inside the case 110. The front cover 110a includes two operation holes 111 in communication with an exterior of the case 110 and the interior space. Two recessed portions 112 recessed towards the interior space are formed on the front cover 110a. Each recessed portion 112 is formed respectively corresponding to each of the two operation holes 111, and each recessed portion 112 includes a lateral communication hole 113. Such that the operation hole 112 is in communication with the interior space via the communication hole 113. In addition, two opposite edges of the front cover 110a each have an aperture 114 in communication with the interior space. After the front cover 110a is combined with the back cover 110b, the apertures 114 are respectively located at two opposite side edges of the case 110.

Referring to FIGS. 1, 2, and 3, the latches 120 are movably disposed in the interior space and located on an inner side face of the front cover 110a. The latches 120 are movably disposed along a moving axis. Each of the latches 120 each includes a connection portion 121, a push portion 122, and a latching portion 123. The connection portion 121 is disposed along the moving axis. The push portion 122 is disposed at one end of the connection portion 121. A part of or all of the push portion 122 is corresponding to and exposed out of case 110 through the operation hole 111. The latching portion 123 is disposed at the other end of the connection portion 121, and corresponding to the aperture 114 of the front cover 110a.

Figure 4:
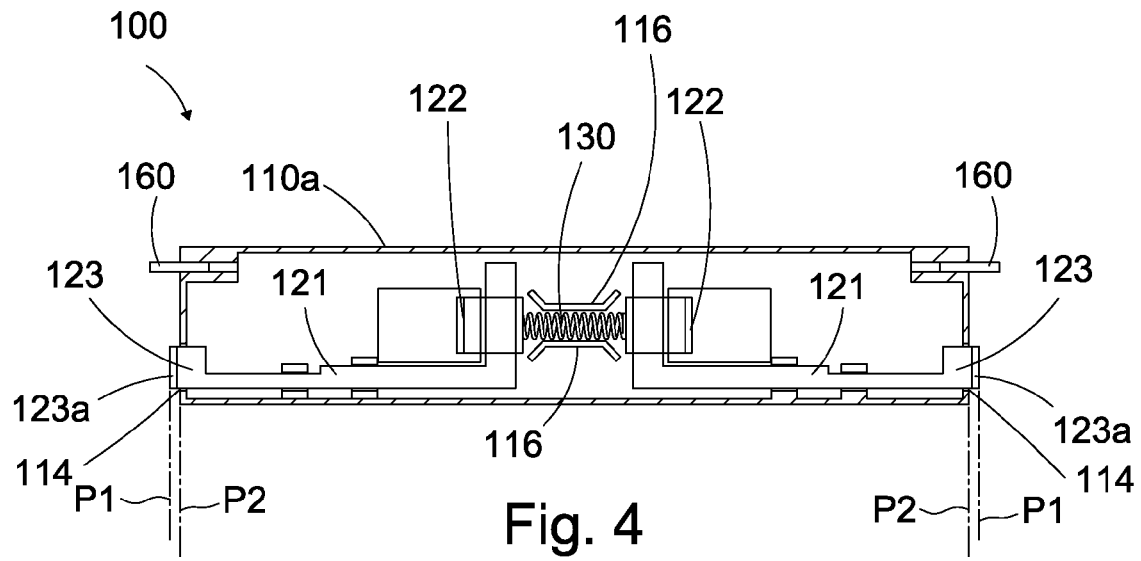
FIGS. 4 and 5 are top views of the first embodiment of the present invention in which the back cover of the removable cover assembly is not shown.
Figure 5:
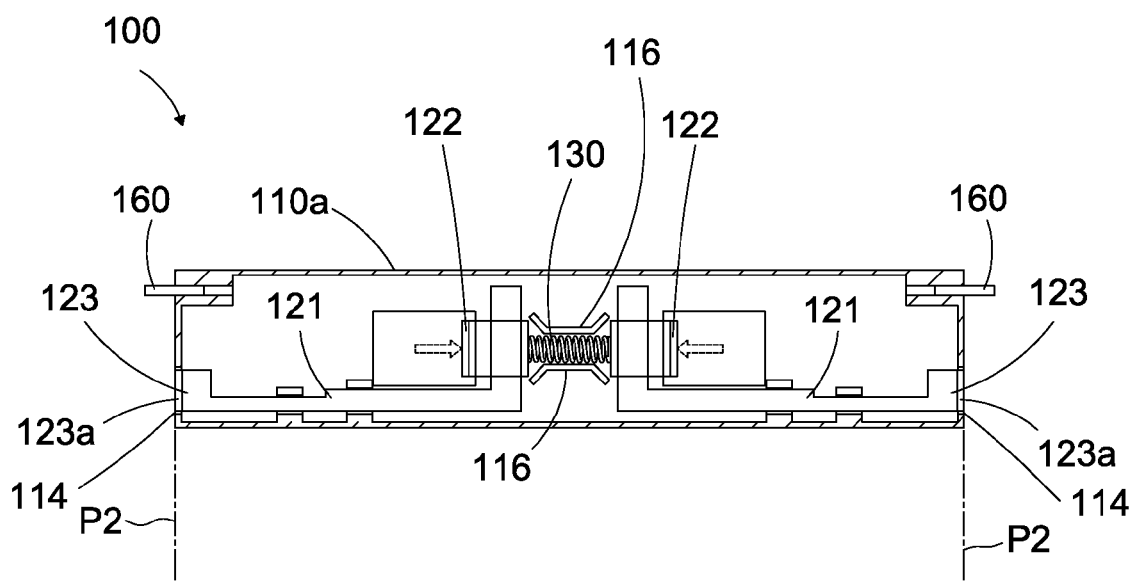

Referring to FIGS. 4 and 5, through the movement of the latch 120, the latching portion 123 selectively has a first position P1 protruding out of the case 110 through aperture 114 and a second position P2 being retracted in the case through the aperture 114.

Referring to FIGS. 1, 2, and 3, a part of the push portion 122 runs through the communication hole 113 of the recessed portion 112 and is located in the recessed portion 112, such that a part of or all of the push portion 122 is corresponding to and exposed out of the operation hole 111. The push portion 122 is provided for a user to press, so as to drive the latch 120 such that the latching portion 123 has the first position P1 or the second position P2.

The latch 120 may be made of metal, and a semi-product of the push portion 122, the connection portion 121, and the latching portion 123 are directly formed through cutting and stamping processes. The semi-product of the push portion 122 includes a plate-like structure protruding outwards from the connection portion 121. After a metal plate process is performed, the plate-like structure is further formed into the push portion 122 that runs through the communication hole 113, such that the push portion 122 is directly monolithically formed on the connection portion 121.

The inner side face of the front cover 110a further includes a plurality of guide portions 115 for guiding the connection portion 121 to run through, thereby limiting a moving path of the latch 120 to a straight line, i.e., limiting the movement of the latch 120 on the moving axis. Each of the guide portions 115 is a groove, and the connection portion 121 runs through each of the grooves. With the cooperation of the guide portions 115, the moving path of the connection portion 121 is limited to a straight line such that the latch 120 is moved on the moving axis.

Referring to FIGS. 1, 2, and 3, the elastic member 130 is disposed in the interior space and located on the inner side face of the front cover 110a, and applies a force to the two latches 120 along the moving axis. The elastic member 130 is a compression spring sandwiched between the two latches 120, and both ends of the elastic member 130 are respectively pressed against the two push portions 122, such that the elastic member 130 is compressed between the two push portions 122. As a result, the elastic member 130 pushes the two latches 120 outwards in opposite directions along the moving axis such that each latching portion 123 runs through the aperture 114 and normally protrudes from a side edge of the front cover 110a. Through force applied by the elastic member 130, the latching portion 123 remains at the first position P1 protruding out of the case 110. In the above embodiment, a single elastic member 130 is used to be sandwiched between the two latches 120 and push the two latches 120 in opposite directions at the same time. In other embodiment, one elastic member is provided for each latch to push the corresponding latch to normally run through the aperture 114 in opposite directions and to have the latching portion remain at the corresponding first positions P1.

FIGS. 4 and 5 are respectively top views of a back side of the removable cover assembly, in which the back cover is not shown in the figures to clearly disclose the motions of the other components.

Referring to FIG. 4, the elastic member 130 is disposed between the two latches 120, and both ends of the elastic member 130 are respectively pressed against the push portions 122 of the two latches 120. The compressed elastic member 130 normally applies force to the two latches 120 to push the two latches 120 outwards along the moving axis, such that front ends of the latching portions 123 pass through the apertures 114 and protrude from the two opposite side edges of the case 110 to be located at the first positions P1. Two clamping plates 116 are disposed on the inner side face of the front cover 110a for fixing the elastic member 130 there-between, so as to dispose the elastic member 130 in parallel with the moving axis.

Referring to FIG. 5, when force is applied to the push portions 122, each of the push portions 122 is pressed against the elastic member 130. The two latches 120 are moved towards the elastic member 130 to compress the elastic member 130, the latching portions 123 of the two latches 120 are retreated to the second positions P2 in the case 110. After the forces applied to the push portions 122 disappear, the elastic member 130 applies elastic force to the latches 120 and pushes them outwards such that the latching portions 123 are again located at the first positions P1 protruding out of the case 110, as shown in FIG. 4.

Figure 6:
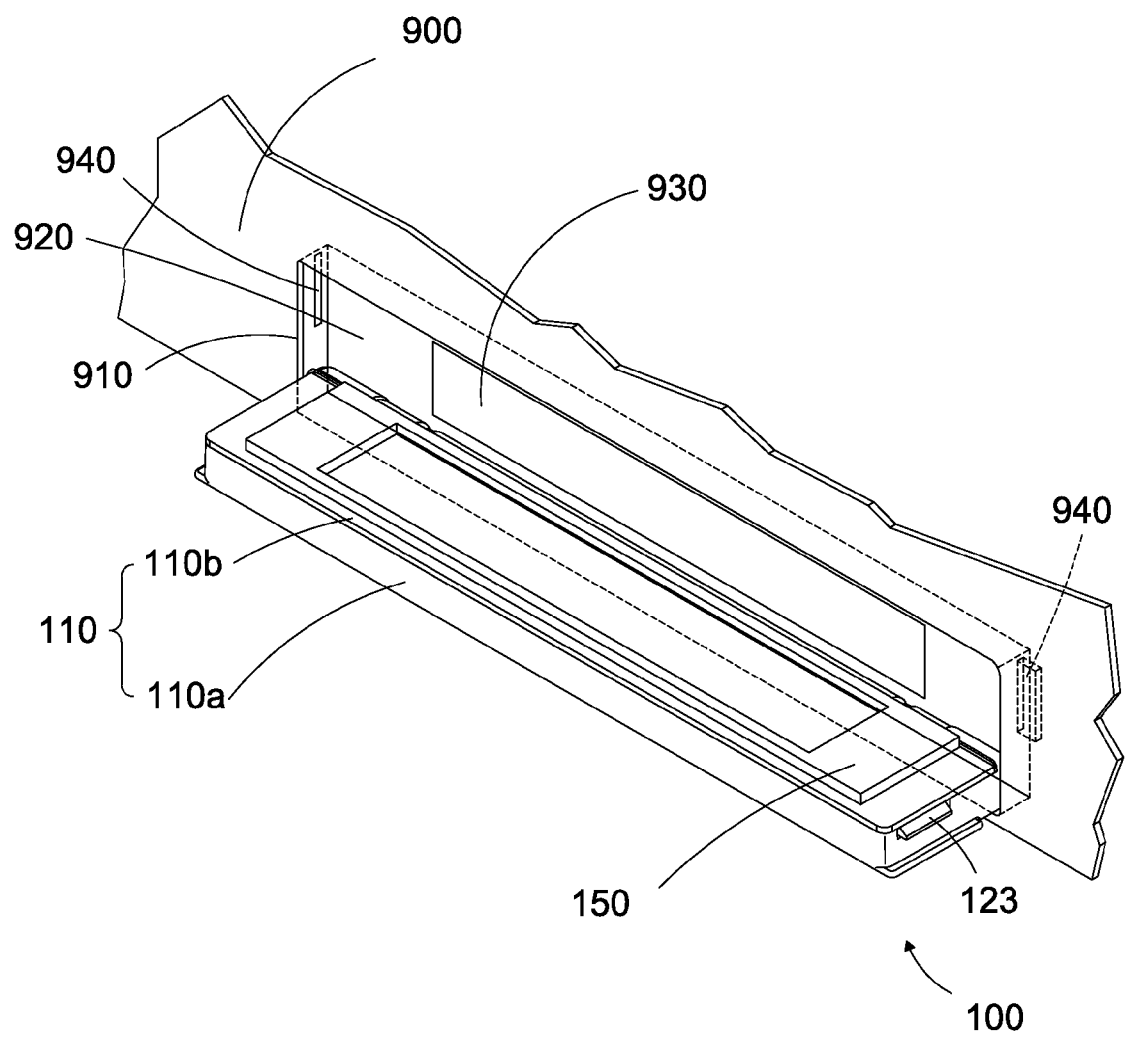
FIG. 6 is a three-dimensional view in which the first embodiment of the present invention is disposed on a housing.

Referring to FIG. 6, an electronic device is further disclosed in the first embodiment of the present invention. The electronic device includes a housing 900 and the aforementioned removable cover assembly 100. The housing 900 includes an opening 910, an inner wall 920, a slot hole 930, and two latch holes 940. The inner wall 920 is formed on a surface of the housing 900 in a recessed manner, and the opening 910 is disposed corresponding to the inner wall 920. The slot hole 930 is formed on the inner wall 920 and in communication with an interior of the housing 900. Generally speaking, an electrical socket, a front panel of an optical disk drive, or a front side face of a removable storage medium reader is located in the slot hole 930.

The removable cover assembly 100 is used for sealing the opening 910. Moreover, the removable cover assembly 100 may be opened as required for a user to use the electrical socket, the optical disk drive, or the removable storage medium reader disposed in the slot hole 930 via the opening 910, and the opening 910 is sealed by the removable cover assembly 100 later. Therefore, foreign objects such as moisture and dust are prevented from entering the housing 900 via the slot hole 930. The removable cover assembly 100 further includes two shafts 160 disposed at two opposite side edges of the front cover 110a and protruding outwards for pivoting the case 110 of the removable cover assembly 100 at an edge of the opening 910 of the housing 900 with the back cover 110b facing the inner wall 920.

The latching portions 123 are respectively corresponding to the latch holes 940 at corresponding parts of inner side edges of the opening 910, and distal ends of the latching portions 123 are further provided with bevel surfaces 123a for contacting the edges of the opening 910. When the removable cover assembly 100 is pushed to the opening 910, the bevel surfaces 123a contact the edges of the opening 910 and generate a component force to push the latches 120 to move inwards, such that the latching portions 123 run through the apertures 114 and are retracted to the second positions P2 in the case 110. In this way, the user no longer needs to apply pressure to the two latches 120 via the push portions 123. After the removable cover assembly 100 completely seals the opening 910, the elastic member 130 again push the latching portions 123 to protrude from the case 110, and in the latching portions 123 latch the latch holes 940 of the housing 900. At this time, the back cover 110b of the case 110 faces the inner wall 920 and shields the slot hole 930. The back cover 110b may closely contact the inner wall 920 to seal the slot hole 930 or keep a distance from the inner wall 920.

When the removable cover assembly 100 is going to be opened, the user applies pressure inwards to the two latches 120 via the push portions 122, such that the latching portions 123 are retreated into the case 110 from the latch holes 940, so as to release the removable cover assembly 100.

In order to enhance waterproof and dustproof, the removable cover assembly 100 further includes a sealing gasket 150 disposed on the back cover 110b for closely contact with the inner wall 920 on the periphery of the slot hole 930 of the housing 900 when the removable cover assembly 100 seals the opening 910, thereby preventing moisture and dust from intruding into the housing 900 via the gap between the housing 900 and the removable cover assembly 100.

In the present invention, a moving direction of the latching portions 123 is perpendicular to a direction in which the removable cover assembly 100 is detached from the housing 900. Therefore, large force provided by the elastic member 130 is not required. Small force is sufficient to maintain the protruding state of the latching portions 123. That is, the elastic member 130 may be a spring or any elastic component having a small elastic coefficient. For operating the removable cover assembly 100, just a small force is required to compress the elastic member 130 so as to push the latches 120.

Figure 7:
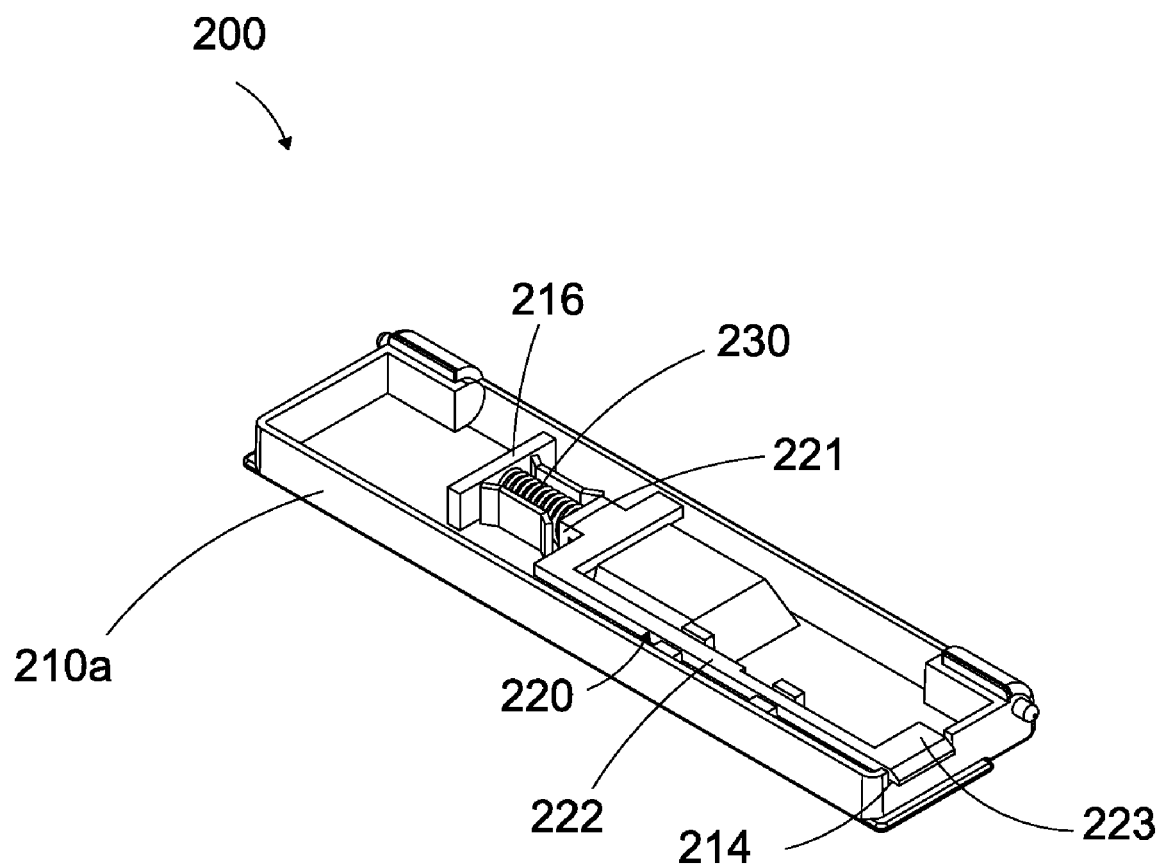
FIG. 7 is a three-dimensional view of a second embodiment of the present invention in which a back cover of the removable cover assembly is not shown.

Referring to FIG. 7, a removable cover assembly 200 of in a second embodiment of the present invention is provided for sealing an opening of a housing. The removable cover assembly 200 is used to be combined with the housing to form an electronic device. The removable cover assembly 200 includes a case, a latch 220, and an elastic member 230. In order to simply the drawings, FIG. 7 only illustrates the front cover 210a for the case, and the back cover is not shown. However, the case is formed by combining the front cover 210a and the back cover.

The removable cover assembly 200 in the second embodiment only includes a single latch 220, and thus the front cover 210a of the case includes only one operation hole, one recessed portion 212, one communication hole, and one aperture 214 corresponding to the latching portion 223. In addition, the front cover 210a further includes a stop portion 216 disposed on an inner side face of the front cover 210a. One end of the elastic member 230 is pressed against the stop portion 216, and the other end is pressed against a push portion 222 of the latch 220, so as to push the latch 220 and to maintain the latching portion 223 normally at a first position protruding out of the case 210.

Figure 8:
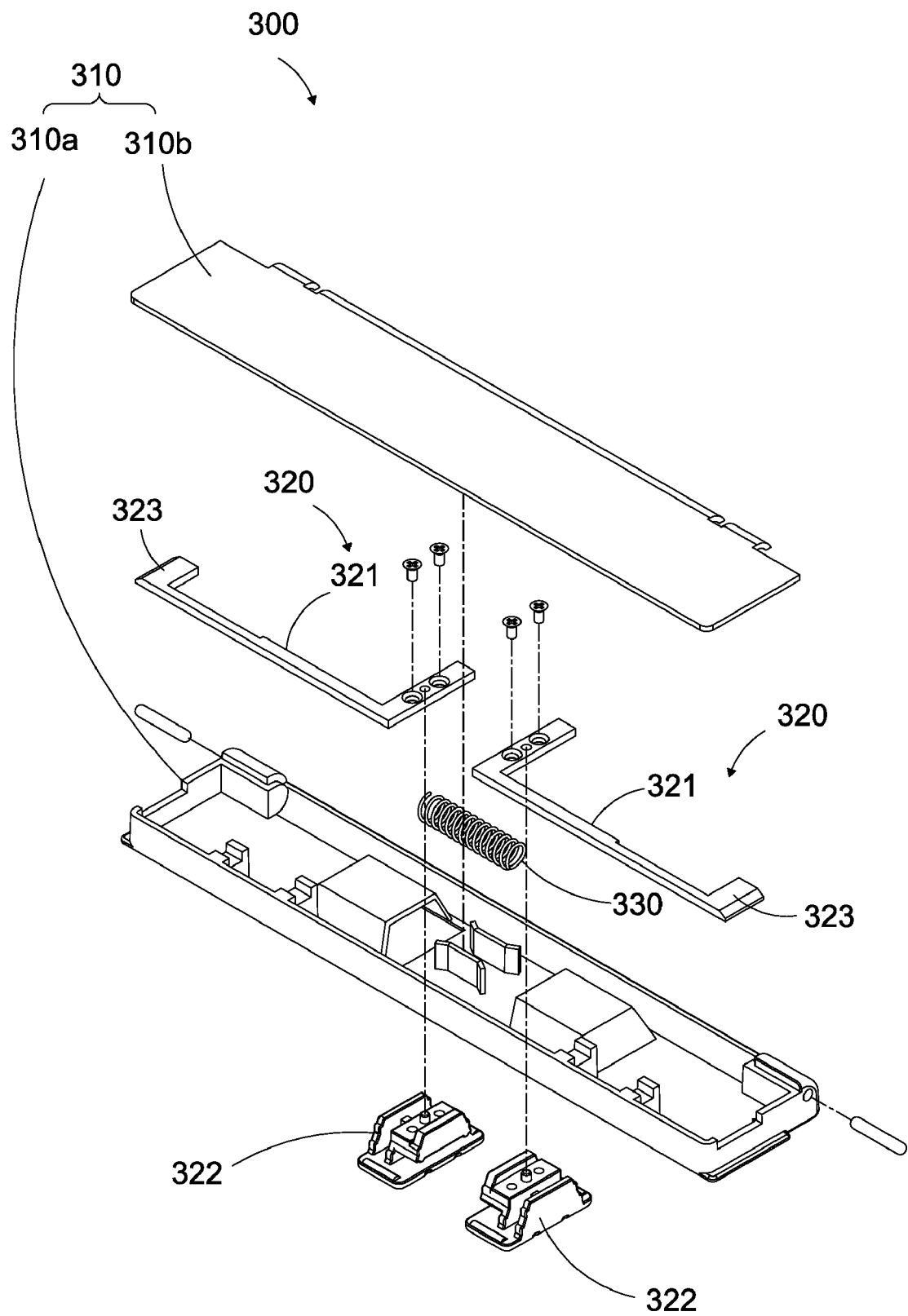
FIGS. 8 and 9 are exploded views of a third embodiment of the present invention from different viewing angles.
Figure 9:
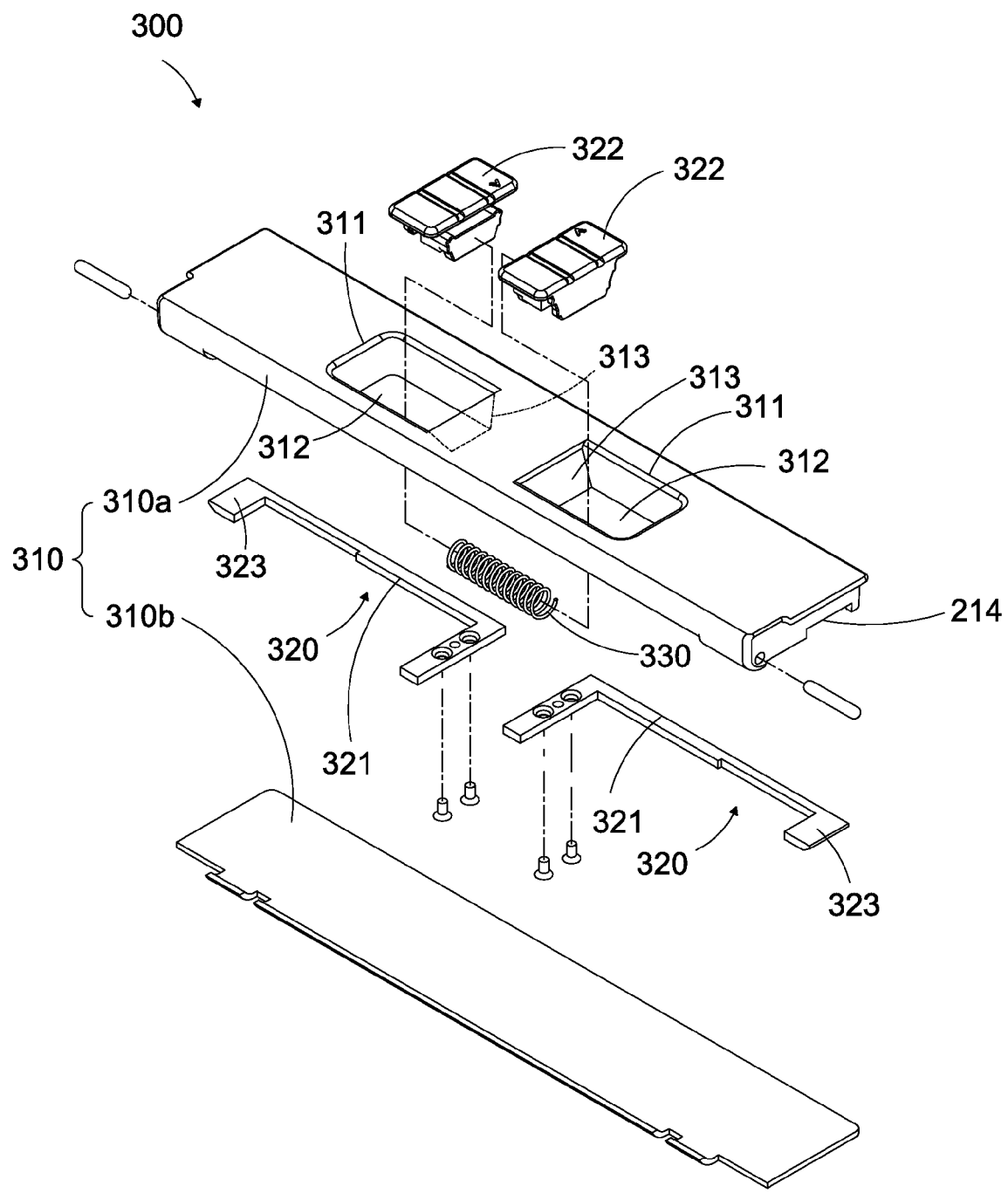

Referring to FIGS. 8 and 9, a removable cover assembly 300 of a third embodiment of the present invention is provided for sealing an opening of a housing. The removable cover assembly is used to be combined with a housing to form an electronic device. The removable cover assembly 300 includes a case 310, two latches 320, and a elastic member 330. The structures of the case 310 and the elastic member 330 are substantially the same as those in the first embodiment, and will not be repeated herein.

Referring to FIGS. 8 and 9, each latch 320 includes a connection portion 321, and a latching portion 323 formed monolithically. A push portion 322 of the latch 320 is separately fabricated and then connected to the connection portion 321 via a communication hole 313. The push portion 322 is located in a recessed portion, and a part of the push portion 322 runs through the communication hole 313 and is located in the case 310. The part of the push portion 322 running through the communication hole 313 and located in the case 310 is connected to the connection portion 321 via a plurality of fixing members, for example, screws. The part of the push portion 322 located in the recessed portion 312 is provided for a user to press in the recessed portion 312, so as to push the latches 320 to move. The separately disposed push portion 322 is provided for the user to press and simplify the structure of the latch 320, so as to avoid the manufacturing problems encountered in fabricating a monolithically formed metal piece and bending the metal piece.

Figure 10:
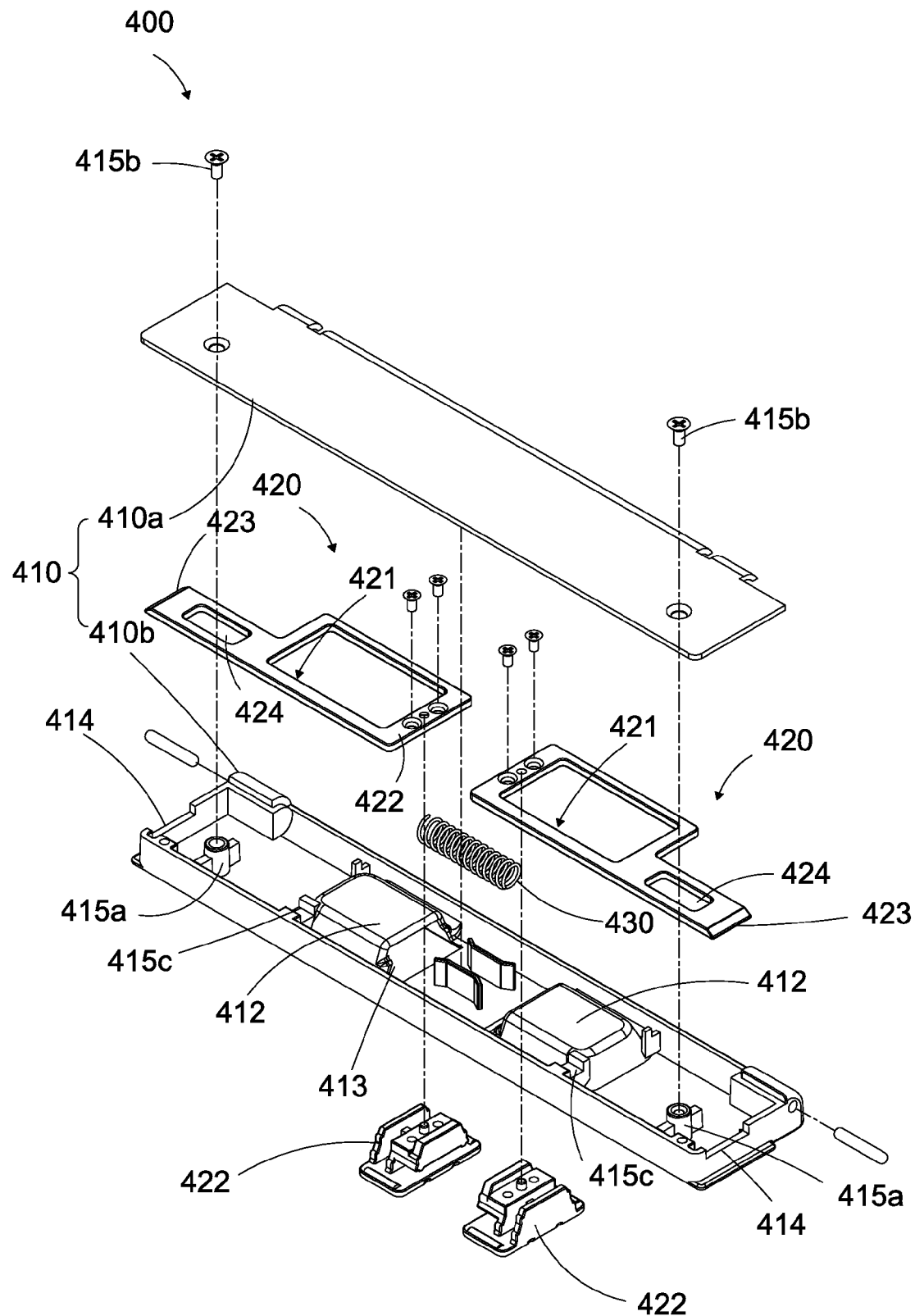
FIG. 10 is an exploded view of a fourth embodiment of the present invention.

Referring to FIG. 10, a removable cover assembly 400 of a fourth embodiment of the present invention is provided for sealing an opening of a housing. The removable cover assembly 400 is used to be combined with a housing to form an electronic device. The removable cover assembly 400 includes a case 410, two latches 420, and an elastic member 430.

Each latch 420 includes a connection portion 421, a push portion 422, and a latching portion 423. The connection portion 421 includes a plurality of segments with or without holes opened. The latching portion 423 is monolithically formed at one end of the connection portion 421. The push portion 422 is separately fabricated and located in a recessed portion 412. At least a part of the push portion 422 runs through a communication hole 413 and is connected to the other end of the connection portion 421 via a plurality of screws or other fixing members. The push portion 422 is provided for a user to press to drive the latch 420 to move and compress the elastic member 430, such that the latching portion 423 is retracted to a second position in the case 410. After the push portion 422 is released, the elastic member 430 pushes the latches 420 outwards in opposite directions, such that the latching portions 423 run through apertures 414 of the case 410 and remain at first positions protruding out of the case 410.

In order to guide the movement of the latches 420 along a straight line, an inner side face of a front cover 410a is further provided with a plurality of guide portions, each including a stud 415a and a screw 415b, wherein the stud 415a is formed on the inner side face of the front cover 410a and located in the interior space. The screw 415b runs through a back cover 410b and is screwed into the stud 415a, so as to combine the back cover 410b with the front cover 410a. Meanwhile, the stud 415a and the screw 415b also run through an oblong hole 424 of the latch 420 at the same time. The guide portion may also be or further include a groove 415c as in the aforementioned embodiments for the connection portion 421 or any part of the latch 420 to pass through. With the cooperation of the guide portions, the moving path of the latches 420 is limited to a moving axis.

What is claimed is:

1. An electronic device, comprising:
a housing having an opening;
a removable cover assembly, comprising:
   a case, including a front cover and a back cover combined with each other to form an interior space inside the case, the front cover including at least one operation hole in communication with an exterior of the case and the interior space, and at least one side of the case includes an aperture in communication with the interior space;
   at least one latch, movably disposed in the interior space, and the latch including:
      a connection portion, disposed along a moving axis;
      a push portion, disposed at one end of the connection portion and having at least a part thereof corresponding to and exposed out of the case through operation hole; and
      a latching portion, disposed at the other end of the connection portion and corresponding to the aperture, and selectively having a first position to protrude out of the case through the aperture and a second position to be retracted in case; and
   an elastic member, disposed in the interior space and applying a force to the latch along the moving axis to have the latching portion run through the aperture and continuously remains at the first position protruding out of the case;
   wherein the removable cover assembly is rotatably fixed to the housing such that it is rotatable between a closed position in which the removable cover assembly seals the opening in the housing, and an open position in which the removable exposes the opening in the housing; and
   wherein the front cover includes a stop portion disposed on an inner side face of the front cover, one end of the elastic member is pressed against the stop portion, and the other end of the elastic member is pressed against the push portion of the latch.

2. The electronic device as claimed in 1, wherein the front cover includes a recessed portion formed corresponding to the operation hole and recessed towards the interior space, the recessed portion includes a lateral communication hole such that the operation hole is in communication with the interior space through the communication hole, and at least a part of the push portion runs through the communication hole and is located in the recessed portion.

3. The electronic device as claimed in 2, wherein the push portion is monolithically formed with the connection portion.

4. The electronic device as claimed in 2, wherein the push portion is combined with the connection portion via the communication hole.

5. The electronic device as claimed in 1, wherein a plurality of guide portions is disposed on an inner side face of the front cover, for guiding the connection portion to pass through, so as to limit a moving path of the latch on the moving axis.

6. The electronic device as claimed in 5, wherein each of the guide portions is a groove and the connection portion runs through each of the grooves.

7. The electronic device as claimed in 5, wherein each of the guide portions comprises a screw and a stud, the stud is disposed on the inner side face of the front cover, the screw runs through the back cover and is screwed into the stud, and the screw and the stud pass through an oblong hole of the latch.

8. The electronic device as claimed in 1, wherein the removable cover assembly comprises two latches, the elastic member is sandwiched between the two latches, and both ends of the elastic member are respectively pressed against the push portions of the two latches to normally push the two latches outwards in opposite directions along the moving axis.

9. The electronic device as claimed in 1, further comprising two shafts disposed at two opposite side edges of the front cover and protruding outwards, for pivoting the case of the removable cover assembly at an edge of the opening of the housing.

10. The electronic device as claimed in 1, wherein a bevel surface is disposed at a distal end of the latching portion for contacting an edge of the opening.

11. The electronic device as claimed in 1, further comprising a sealing gasket disposed on the back cover.

12. The electronic device as claimed in 1, wherein a surface of the side of the case including the aperture is flush with an exposed surface of the latching portion when the latching portion is in the second position.

13. An electronic device, comprising:
a housing, including:
   an inner wall, formed on a surface of the housing in a recessed manner;
   an opening, formed corresponding to the inner wall; and
   a slot hole, formed on the inner wall and in communication with an interior of the housing; and
a removable cover assembly, comprising:
   a case, comprising a front cover and a back cover combined with each other to form an interior space inside the case, for sealing the opening with the back cover facing the inner wall, the front cover including at least one operation hole in communication with an exterior of the case and the interior space, and at least one side of the case includes a aperture in communication with the interior space;
   at least one latch, movably disposed in the interior space, wherein the latch comprises:
   a connection portion, disposed along a moving axis;
   a push portion, disposed at one end of the connection portion and at least a part thereof being corresponding to and exposed out of the case through the operation hole; and
   a latching portion, disposed at the other end of the connection portion and corresponding to the aperture, and selectively having a first position to protrude out of the aperture to latch an edge of the opening and a second position to be retracted into the aperture;
   wherein the removable cover assembly is rotatably fixed to the housing such that it is rotatable between a closed position in which the removable cover assembly seals the opening in the housing, and an open position in which the removable exposes the opening in the housing; and
a elastic member, disposed in the interior space and applying a force to the latch along the moving axis to have the latching portion run through the aperture and normally remains at the first position protruding out of the case;
wherein a plurality of guide portions are formed on an inner side face of the front cover, for guiding the connection portion to pass through, so as to limit a moving path of the latch on the moving axis; and
wherein each of the guide portions comprises a screw and a stud, the stud is disposed on the inner side face of the front cover, the screw runs through the back cover and is screwed into the stud, and the screw and the stud pass through an oblong hole of the latch.

14. The electronic device as claimed in 13, wherein the front cover includes a recessed portion formed corresponding to the operation hole and recessed towards the interior space, the recessed portion includes a lateral communication hole such that the operation hole is in communication with the interior space through the communication hole, and at least a part of the push portion runs through the communication hole and is located in the recessed portion.

15. The electronic device as claimed in 14, wherein the push portion is monolithically formed on the connection portion.

16. The electronic device as claimed in 14, wherein the push portion is combined with the connection portion via the communication hole.

17. The electronic device as claimed in 13, wherein the removable cover assembly comprises two latches, the elastic member is sandwiched between the two latches, and both ends of the elastic member are respectively pressed against the push portions of the two latches to normally push the two latches outwards in opposite directions along the moving axis.

18. The electronic device as claimed in 13, wherein the front cover comprises a stop portion disposed on an inner side face of the front cover, one end of the elastic member is pressed against the stop portion, and the other end of the elastic member is pressed against the push portion of the latch.

19. The electronic device as claimed in 13, comprising two shafts disposed at two opposite side edges of the front cover and protruding outwards, for pivoting the case of the removable cover assembly at the edge of the opening.

20. The electronic device as claimed in 13, wherein a bevel surface is disposed at a distal end of the latching portion for contacting the edge of the opening.

21. The electronic device as claimed in 13, further comprising a sealing gasket disposed on the back cover, for contacting the inner wall to seal the slot hole.

22. The electronic device as claimed in 13, wherein the housing further comprises at least one latch hole disposed at an inner side edge of the opening, for catching the latching portion at the first position therein.

23. The electronic device as claimed in 13, wherein a surface of the side of the case including the aperture is flush with an exposed surface of the latching portion when the latching portion is in the second position.

* * * * *